United States Patent [19]
Gaffney

[11] 3,725,518
[45] Apr. 3, 1973

[54] METHOD FOR PRODUCING A TUBULAR NET PRODUCT

[75] Inventor: Bernard J. Gaffney, Stillwater, Minn.

[73] Assignee: Conwed Corporation, St. Paul, Minn.

[22] Filed: Sept. 29, 1970

[21] Appl. No.: 76,417

[52] U.S. Cl. .................264/24, 264/26, 264/89, 264/91, 264/130, 264/131, 264/167, 264/178, 264/210 R, 264/289, 264/DIG. 81
[51] Int. Cl. .........B29d 7/24, B29d 9/08, B32b 5/16
[58] Field of Search..........264/167, 173, 24, 26, 209, 264/121, 210, 112, 289, 91, 95, 90, 131, 130; 161/87, 64; 156/74, 169, 244

[56] References Cited

UNITED STATES PATENTS

| 3,520,766 | 7/1970 | Newman | 161/87 |
| 3,533,884 | 10/1970 | Quackenbush | 264/173 |
| 3,436,442 | 4/1969 | Saks | 264/24 |
| 3,222,440 | 12/1965 | Murphy | 264/167 |

Primary Examiner—Robert F. White
Assistant Examiner—Jeffery R. Thurlow
Attorney—Eyre, Mann & Lucas

[57] ABSTRACT

A method is provided for producing a polymer product by extruding a tubular net and applying a finely divided material to the net to form a new product. In one embodiment the finely divided material may at least partially block the openings of the net. When the openings are partially blocked, the product may be biaxially oriented by applying a pressure differential between the interior and the exterior of the product immediately after extrusion. The pressure differential is maintained by the partial blockage of the openings in the extruding net to permanently stretch and orient the net.

15 Claims, 5 Drawing Figures

PATENTED APR 3 1973 3,725,518

*INVENTOR.*
DR. BERNARD J. GAFFNEY
BY Eyre, Mann & Lucas
*ATTORNEYS*

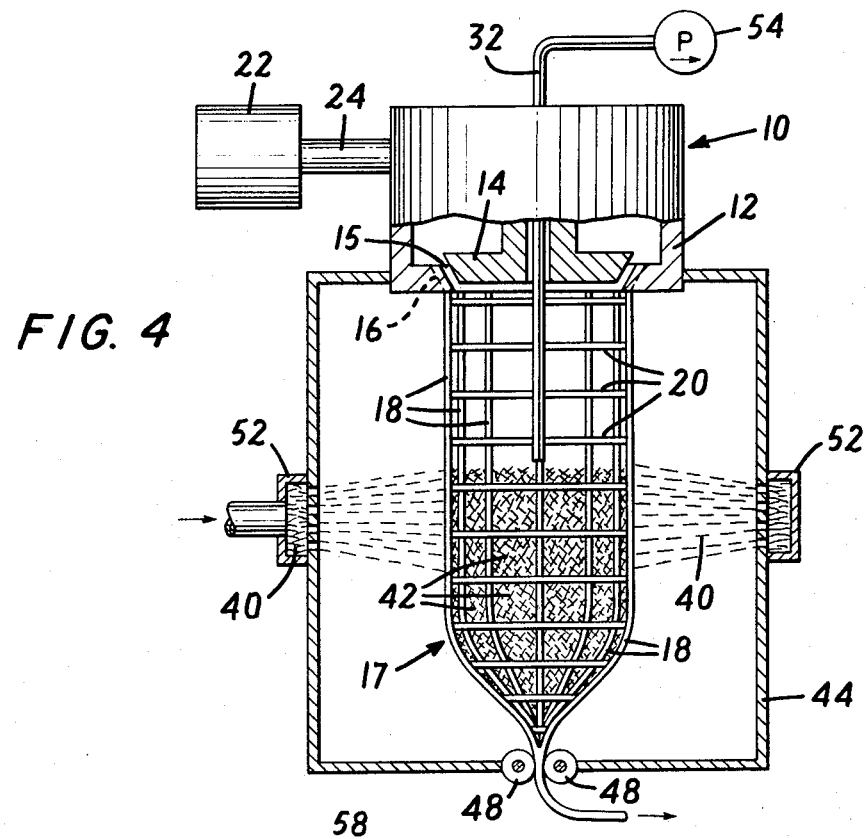
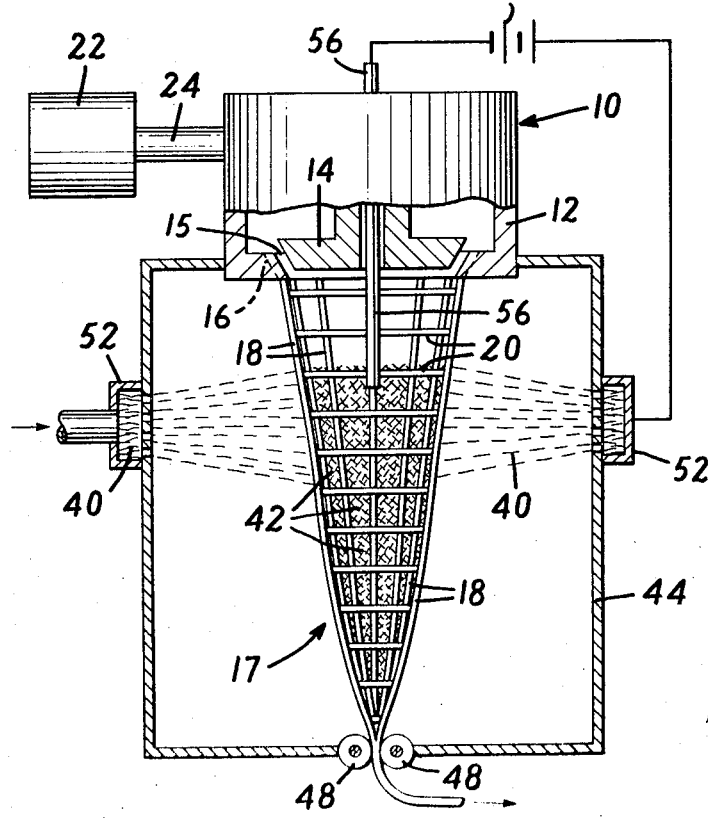

METHOD FOR PRODUCING A TUBULAR NET PRODUCT

In accordance with the present invention, a tubular net having a plurality of cross strands between which there is a plurality of openings is extruded from a conventional extrusion apparatus. Any polymer capable of being softened to a flowable condition and later rehardened to retain the extruded shape, such as polypropylene, polyethylene, etc., may be used to extrude the tubular net. After the tubular net is extruded, a finely divided material in the form of particulates or fibrous strands of either polymer or any plastic or ceramic or metallic material capable of being bonded, embedded or at least temporarily retained by the strands of the extruded tubular net is deposited on the extruded tubular net to form a new and novel polymer product. The finely divided material may be used to partially block the openings in the net and in such case the net may be stretched and under proper conditions also oriented biaxially. The finely divided material will also serve to reinforce the strands and strengthen the final product. Examples of useable materials are plastic, glass or metal in the form of fibers, filaments or particles alone or in combination. The size of the material is selected for the desired result. If only a surface decoration is desired the particles may be extremely small and merely deposited in the surface of the strands of the net. Relatively long fibers are the best for closing the open pores in the net, as used herein the term finely divided material is intended to mean fibers and filaments as well as particulate powdered materials.

In one embodiment of the instant invention a pressure differential is applied between the interior and the exterior of the extruding tubular net to force the finely divided material to migrate to and associate with the strands of the extruding net to at least partially block the openings thereof. In most cases, the finely divided material will be permanently bonded to the strands of the net. Of course, the term tubular is here used to include all annular-like nets such as square, rectangular or elliptical shapes, and the term is not to be limited to circular.

The finely divided material may be deposited either inside or outside the extruded tubular net. If the finely divided material is deposited in the interior of the net, then the pressure differential used to cause migration of the finely divided material to the strands of the net will be such that the pressure in the interior of the net is higher than on the outside thereof. Conversely, if the finely divided material is deposited around the exterior of the net, the pressure used will be greater on the exterior of the net.

For best results, the finely divided material contacts the strands of the net while the strands are at a high temperature, preferably near the polymer melt temperature or at a temperature when the polymer is still tacky to help cause bonding between the finely divided material and strands of the net or to at least embed the finely divided material in the strands of the net. If desired, the finely divided material may be heated either with or without heating the strands of the net and then migrated to the extruding net to cause bonding.

When producing the novel polymer product by the above-described methods, it is preferred to extrude the net into a liquid bath such as water. The water provides a buoyant force which tends to reduce the stresses of the extruded net near the extrusion apparatus to help prevent tearing the very hot and easily torn net as it leaves the extrusion die. In such case, the finely divided material will be deposited in the interior of the tubular net above the level of the water or sufficient pressure may be established within the interior of the net to remove some of the liquid from the net interior.

The unique product of the instant invention may in another embodiment be produced by depositing an electrically charged, finely divided material adjacent the extruded tubular net and then an electrostatic field is established between the interior and the exterior of the net to cause the finely divided material to migrate and bond to the net. This may be achieved by mounting a bar of conductive material in the interior of the net and by connecting the bar to a source of electric energy. The other pole of the source of electric energy is connected to the source of electrically charged finely divided material to establish the electrostatic field which will force the electrically charged material to migrate to the net. The finely divided material may be metallic or a polymer material which has metallic or other conductive particles embedded therein which have the free electrons needed for causing the material to move in response to the applied electrostatic field. Of course, the finely divided material may be provided with either a positive or negative electric charge as the case may be to permit the finely divided material to be deposited on the tubular net.

In accordance with another aspect of the present invention, the partially blocked openings may be utilized to biaxially orient the net while it is extruding. This may be done by maintaining or increasing the applied pressure differential described above. The blockage of the openings by the finely divided material increases the resistance to air flow between the interior and exterior of the net, thereby helping to maintain and increase the applied pressure differential between the interior and exterior of the net. The pressure differential, if great enough, will stretch and permanently orient the hot and deformable net. The sufficiency of the pressure differential is most readily determined simply by observing its action on the extruding net and increasing or decreasing it accordingly. Of course, the applied pressure differential acts perpendicular to the surface of the net and the radial distention of the net by the pressure force will stretch the net in both its longitudinal and transverse directions.

If desired, the instant invention may be utilized to produce a biaxially oriented tubular net in which the finely divided material is removed from the net after orientation has been completed. This may be achieved by providing a finely divided material which will not bond to the extruding net, such as a polytetrafluoroethylene or other material having a low surface friction coefficient, or the finely divided material may be treated with a non-stick agent which will preclude bonding between the finely divided material and the strands of the net. Of course, the finely divided material will still migrate to and at least partially block the openings in the net for as long as the applied pressure differential exists although the non-stick character of the finely divided material will preclude a permanent association between the material and the net. Of course, mechanical means such as brushes or chemical means such as wetting agents may be used after orientation is complete to reduce the surface forces between the net and the finely divided material to aid in separating the finely divided material from the strands of the net. If desired, the extruded net may be cooled somewhat prior the orientation to help prevent the treated material from becoming embedded in the strands of the net and to lessen the surface forces which tend to hold the two together.

Referring to the drawings in which various preferred embodiments are depicted and in which like numerals refer to like parts:

FIGS. 3 and 4 are schematic plan views of another embodiment of the apparatus of FIG. 1.

FIG. 5 depicts still another embodiment in schematic form of the apparatus of the instant invention.

Figure 1:
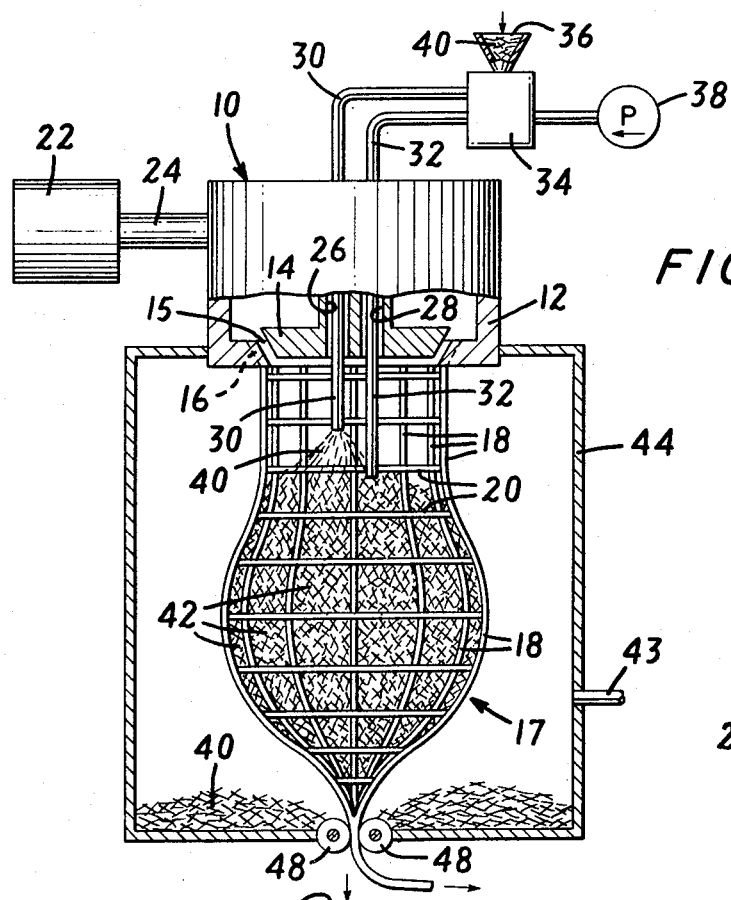
FIG. 1 is a plan schematic and partial sectional view of an apparatus useful to both produce a polymer product and to biaxially orient the product.
Figure 2:
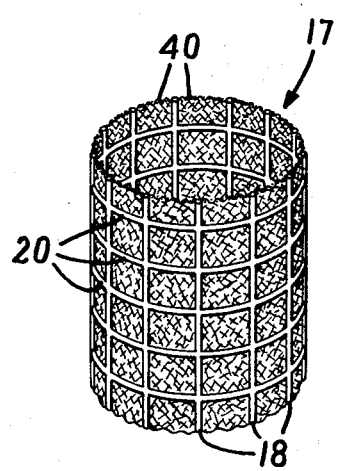
FIG. 2 is an isometric representation of a product producable by the apparatus depicted in all of the embodiments described herein.

Referring now to FIGS. 1 and 2, there is seen a die 10 which is comprised of an outer stationary die member 12 and inner moveable die member 14. The die member 12 has a plurality of grooves 16 for the continuous extrusion of longitudinal strands 18. In the position shown in FIG. 1, die member 14 is spaced from outer die member 12 to create an annular extrusion opening 15 through which polymer flows in a ring to create a transverse strand 20. The opening 15 as shown communicates with grooves 16 so that the transverse strand 20 is bonded to longitudinal strands 18 and extruded as a unitary structure therewith from the die 10 to form the tubular net shown in the FIGS. 1 and 2. Die member 14 is moveable downwardly from the position shown in FIG. 1 to close the opening 15 to periodically halt the extrusion of polymer from the opening 15 and to complete the information of the transverse strand 20. Of course, the opening and closing of opening 15 does not significantly interfere with the continuous extrusion of the strands 18 from the grooves 16.

The die 10 is fed polymer for extrusion from a conventional extruder 22 which is connected to die 10 by conduit means 24 in a manner well known in the art.

To produce the product depicted in FIG. 2, inner moveable die member 14 is provided with bores 26, 28 in which pipe means 30, 32 are mounted respectively. Pipe means 30 and 32 exit from the top of the die 10 and are connected to a collector 34 into which finely divided material 40 is fed through opening 36. Connected to hopper 34 is a conventional pump 38 which is adapted to provide air under pressure to collector 34 to move the finely divided material trough pipe 30 into the interior of the extruding net and in addition to supply air pressure through pipe 32 to cause the finely divided material fed into the interior of the net to migrate to the extruded strands. Pipe means 30 is adapted to release the finely divided material 40 in the interior of the net at a point above that at which air is introduced by pipe means 32 to aid in achieving dispersion of the finely divided material by the air flow from pipe 32 and to help overcome the gravity forces which tend to urge the finely divided material to sink to the bottom of the tubular net. FIG. 2 shows the finely divided material 40 after bonding to the strands 18 and 20 and it is evident from FIG. 2 that the finely divided material 40 at least partially blocks the openings 42 in the extruding net. In this example cellulose fibers with a length slightly greater than the largest dimension of the pore opening are preferred for blocking the openings in the net.

The pressure supplied by pump 38 through conduit 32 initially creates an air flow from the interior of the tubular net to the exterior thereof. To orient the extruded tubular net 17, the air pressure supplied by pump 38 is either maintained or increased to increase the pressure differential between the interior and exterior of the net 17. As the resistance to air flow through the openings 42 increases due to an increasing concentration of finely divided material 40 in the openings 42, the net will begin to expand and stretch. The amount of stretch will be correlated to the value of the applied pressure differential, i.e., the greater the value of the differential, the greater the amount of stretch. No one pressure differential can be given to satisfy all modes of operation of the apparatus or for different types of tubular net, but the pressure differential to be used to achieve the desired degree of orientation is arrived at by simply observing the action of the pressure differential on the extruding tubular net and adjusting it accordingly to attain the desired degree of stretch. Since the applied pressure acts perpendicular to the interior surface of the extruding net, the net will be stretched and oriented in both its longitudinal and transverse directions to give a biaxially oriented product which hosts a large number of fibrous strands or particulates permanently affixed to the strands 18 and 20. For best results, a tank 44 is provided which surrounds the tubular net to collect excess material 40 which does not bond to the strands 18 and 20. To prevent undue pressure from building up around the exterior of the net which would tend to decrease the applied pressure differential, a small air pipe 43 may be provided to continuously bleed the area surrounding the exterior of the net to help maintain the applied pressure differential.

If desired, the finely divided material 40 may be a material which will not stick to the extruding strands 18 and 20 such as polytetrafluoroethylene.

After orientation is complete, the finely divided material may be removed by use of a brush, chemical wetting agent or other conventional removal devices to achieve a biaxially oriented net product.

To produce a non-oriented tubular net with the apparatus shown in FIG. 1, it is best to extrude the net into water (not shown) held in the tank 44. The water bath applies a buoyant force to the extruded net to prevent the natural forces of extrusion and the action of the applied air pressure from tending to tear the net while it is hot and easily deformable as it exits from the die 10. The air pressure inside the tube of the net is preferably raised to the point where it will counter balance the hydrostatic force exerted by the liquid and displace liquid from the interior of the net. Care should be taken to apply only enough pressure to remove liquid from the interior but still leave the liquid in contact with at least some of the strands. Otherwise, the advantages gained from utilizing the liquid may be lost.

As seen in FIG. 1, the net is removed from the bottom of the tank 44 by means of nip rolls 48, which both fold the net into a flat configuration and prevent leakage of water from tank 44.

Figure 3:
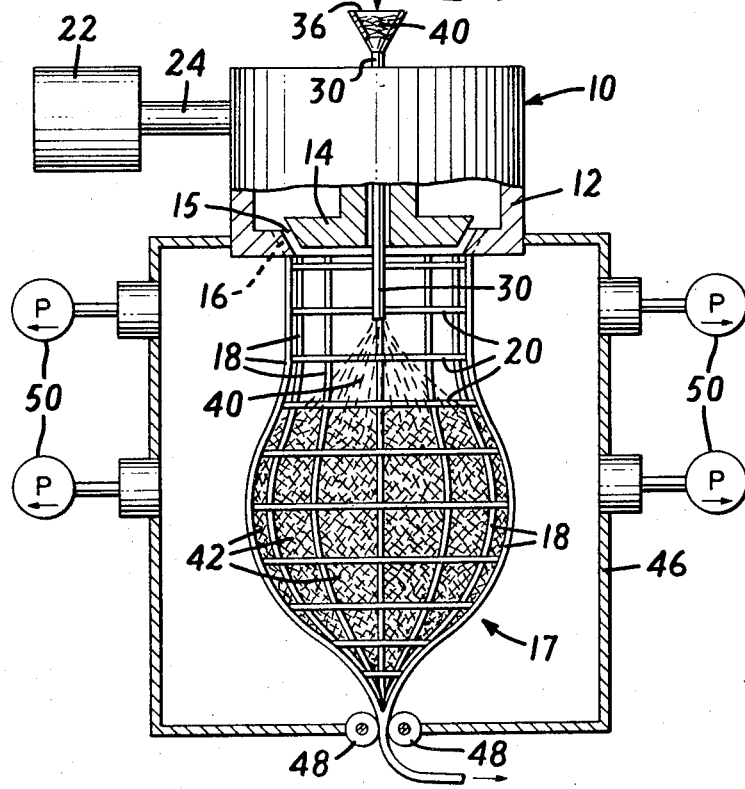

Referring now to FIG. 3, there is seen an apparatus similar to that of FIG. 1 except that the pressure pump 38 has been removed and replaced by a plurality of vacuum pumps 50 spaced around the periphery of tank 46. The vacuum pumps are adapted to create a partial vacuum around the exterior of the extruding tubular net 17 to increase the pressure differential between the interior and exterior of the tubular net. As in FIG. 1, the finely divided material 40 is fed to hopper 36 and then to collector 34 form which it is fed to the interior of the extruding net 17 through the pipe 30. The vacuum pumps, by sucking air from the tank 46, force the finely divided material 40 to migrate to the strands 18 and 20 of the net. Although not shown, the interior of the extruding net 17 is open to atmospheric pressure through the extrusion die 10 to continuously supply air at atmospheric pressure to the interior of the tube to maintain the pressure differential established by the vacuum pumps 50. As in the FIG. 1 embodiment, the finely divided material will be forced by the flow of air to migrate to and block the openings 42 in the extruding tubular net 17. As the blockage of openings 42 becomes greater, resistance to air flow becomes greater and the pressure differential established between the interior and exterior of the extruding tubular net will force the tubular net 17 to expand and permanently stretch to the desired degree of orientation.

The apparatus of FIGS. 1 and 3 may be used to produce a non-oriented tubular net having fibrous strands or particulates joined to the strands 18 and 20 as shown in FIG. 2 by maintaining the pressure differential between the interior and exterior of the extruding tubular net low enough to prevent stretching of the strands 18 and 20. The maximum applied pressure differential is simply determined by examining the tubular net and adjusting the said pressure differential until a no-stretch condition is obtained.

Referring now to FIG. 4, there is seen another embodiment of apparatus useful for producing the tubular net of FIG. 2 and also for orienting such tubular net. In this embodiment, the finely divided material 40 is fed from an annular container 52 which is mounted in the interior of the tank 44. The tank 44 may or may not be open to atmosphere for the reasons described in connection with the FIG. 3 embodiment. The driving force for removing the finely divided material 40 from the chamber 52 is supplied by the pipe 32 which connects the interior of the tubular net 17 with a vacuum pump 54 positioned outside of the die 10. As in the previous embodiment, the the vacuum force applied by pump 54 will cause migration of the finely divided material 40 from chamber 52 to the strands 18 and 20 of the tubular net to cause the finely divided material at least partially to block the openings 42 in the tubular net. If orientation is desired, the vacuum pump 54 is maintained in operation until sufficient blockage of the openings 42 occurs to create a pressure differential between the interior and the exterior of the extruding tubular net. The tank 44 will then be open to atmosphere to help maintain the applied pressure differential. When a sufficient pressure differential is created, the extruding tubular net will permanently stretch as determined by the magnitude of the applied pressure differential between the interior and the exterior of the tubular net.

Referring now to FIG. 5, there is seen another type of apparatus for producing the tubular net of FIG. 2 except that in this embodiment, no pressure force is applied to produce migration of the finely divided material to the strands 18 and 20 of the extruding tubular net 17. In the apparatus shown in FIG. 5, an electrically conductive material in bar form as shown at 56 is mounted in die member 14 with the bar 56 extruding downwardly into the interior of the tubular net 17. The bar 56 is connected to an electrical energy source 58 which is in turn connected to the feed hopper 52. Feed hopper 52 surrounds the tubular net to create an electrical field between feed hopper 52 and the bar 56. The finely divided material 40 must in this case be an electrically charged material such as a polymer with metallic particles embedded therein which will migrate from feed hopper 52 to net 17 due to the electrostatic force field existing between the hopper 52 and the bar 56. If desired, a pressure force may be applied to the tubular net to orient the net in accordance with either the FIGS. 1, 3 or 4 embodiments if this is desired.

It will be understood that the present invention may be employed in conjunction with an extruded flat sheet of polymer product with or without openings therein by providing a pressure differential on opposite sides of the sheet or by establishing an electrical field which causes finely divided material to migrate to the product when supplied in a zone adjacent thereto.

It is intended to cover all modifications and changes to the embodiments herein chosen for purposes of illustration which do not constitute departures of the spirit and scope of the invention.

What is claimed is:

1. A method for stretching an extruded polymer tubular net product comprising the steps of feeding a finely divided material adjacent the extruding tubular net and applying a pressure differential between the interior and exterior of the tube to cause said finely divided material to migrate to at least partially block the openings in said net, and maintaining a sufficient air pressure differential between said interior and exterior to stretch said net as the resistance to air flow through the opening in the net increases with increasing material concentration in the said openings.

2. The method specified in claim 1 wherein the step of feeding a finely divided particulate material adjacent the tubular net includes the step of feeding the finely divided polymer to the interior of the tube.

3. The method specified in claim 1 wherein the step of feeding finely divided material adjacent the tubular net includes the step of feeding a particulate material to the interior of the tube.

4. The method specified in claim 1 wherein the step of feeding a finely divided material adjacent the tubular net includes the step of feeding a fibrous material to the said tube interior.

5. The method specified in claim 1 wherein the step of applying a pressure differential between the interior and exterior of the tubular net comprises the step of applying pressure to the interior of the tubular net.

6. The method specified in claim 1 which includes the step of biaxially orienting the product.

7. The method specified in claim 1 wherein the step of applying a pressure differential between the interior and exterior of the tubular net comprises the step of subjecting the interior of the tubular net to a reduced pressure.

8. The method as specified in claim 7 further comprising the step of increasing the air pressure in the interior of the extruding tubular net to help maintain the said pressure differential.

9. The method specified in claim 1 further comprising the step of treating the finely divided material with a non-stick agent to prevent the finely divided material from permanently bonding to the tubular net.

10. The method specified in claim 2 further comprising the step of heating the finely divided material to cause bonding between the tubular net and the said finely divided material.

11. The method specified in claim 1 further comprising the step of maintaining the tubular net at a temperature sufficient to cause the finely divided material to bond thereto.

12. The method specified in claim 5 further comprising the step of introducing the finely divided material above the point at which the air is admitted to the tubular net to help disperse the finely divided material.

13. The method specified in claim 5 further comprising the step of extruding the tubular net product into a liquid bath to provide buoyancy for the tubular net to prevent tearing the tubular net as it extrudes, and maintaining sufficient air pressure inside said tubular net to both orient said tubular net and maintain the interior of the tubular net substantially free from liquid.

14. A method for biaxially orienting a polymer tubular net while it is extruding comprising the steps of supplying an electrically charged finely divided material adjacent the said tubular net, applying an electrostatic force field between the interior and the exterior of said tubular net to attract said electrically charged finely divided material to the tubular net to at least partially block the net openings, and applying a pressure differential between the interior and exterior of the tubular net to stretch and orient the said tubular net.

15. The method specified in claim 14 wherein the step of applying pressure differential between the interior and exterior of the tubular net comprises the step of applying a partial vacuum force to the exterior of said tubular net.

* * * * *